M. C. FRENCH.
ANTICLOG TRACTOR WHEEL.
APPLICATION FILED MAR. 17, 1917.

1,323,687. Patented Dec. 2, 1919.

INVENTOR
Morgan C. French

By
W. J. Fitz Gerald & Co.
ATTORNEYS

UNITED STATES PATENT OFFICE.

MORGAN C. FRENCH, OF DENVER, COLORADO.

ANTICLOG TRACTOR-WHEEL.

1,323,687. Specification of Letters Patent. Patented Dec. 2, 1919.

Application filed March 17, 1917. Serial No. 155,412.

*To all whom it may concern:*

Be it known that I, MORGAN C. FRENCH, a citizen of the United States, residing at Denver, in the county of Denver and State of Colorado, have invented certain new and useful Improvements in Anticlog Tractor-Wheels; and I do hereby declare the following to be a full, clear, and exact description of the invention, such as will enable others skilled in the art to which it appertains to make and use the same.

My invention relates to a new and useful anti-clog tractor wheel and is designed for use upon vehicles, trucks, tractors and the like, but is more particularly designed for sage brush plows and the like.

One of the aims of my invention is to provide a wheel so that it will be impossible for the wheel to become clogged with mud, trash, and other accumulations upon the surface of the road or field over which the wheel travels and at the same time force the mud, trash, etc., to the outer side of the wheel and away from its path of travel and yet provide for the free penetration of the lugs into the ground which are mounted upon the periphery of the wheel rim.

Another aim of my invention is to provide the wheel with detachable lugs whereby the same may be readily replaced when they have become damaged from any cause, and to also provide means for bracing the lugs when the wheel is employed in characters of work whereby the lugs are subjected to undue strains.

A further aim is to provide the wheel with a supplemental tire for protecting the lugs against injury when the wheel is required to travel over the surfaces of hard roads and the like when the vehicle or machine upon which the wheel is used is being transported from place to place.

These and other objects and advantages will more fully appear as the nature of the invention is more clearly understood from the following specification, the subject-matter of the claims, and the views illustrated in the accompanying drawings, in which, Figure 1 is an elevational view of the outer side of the wheel showing the same with the supplemental transporting tire mounted thereon.

Figure 1:
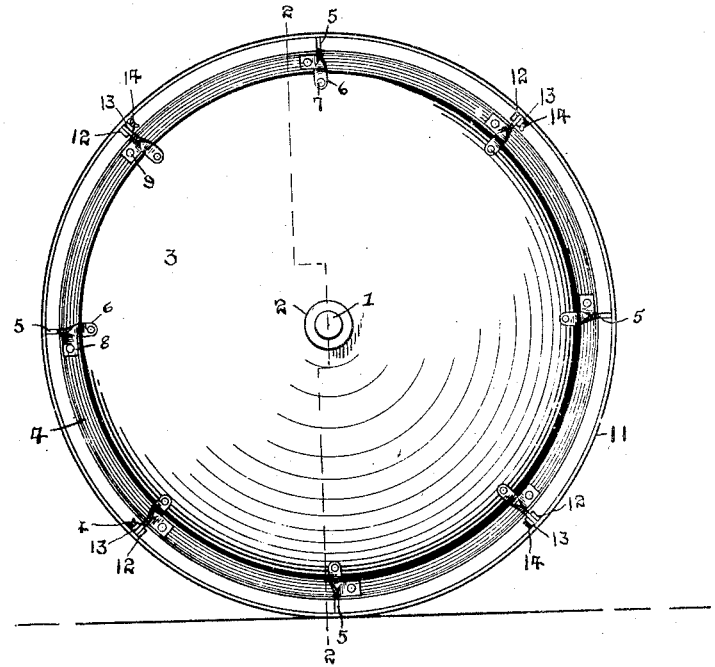

Referring to the drawings, wherein similar reference characters denote corresponding parts throughout the several views, 1 denotes the axle of a vehicle or the like upon which is suitably mounted the elongated hub 2 of the wheel. The body 3 of the wheel is constructed of a solid web and formed of a substantially cone-shaped conformation with the apex of the cone-shaped web projecting outwardly and through which apex extends the hub 2. The peripheral edge of the body or web 3 is bent laterally with respect to the body or web 3 to provide the main tire 4 for the wheel.

The inward inclination of the outer surface of the body or web 3 from the hub 2 toward its periphery is substantially 20 degrees from a vertical plane, while the inward inclination of the tire 4 is substantially 65 degrees from a vertical plane or substantially 45 degrees with respect to the degree of inclination of the outer surface of the body or web 3, or in other words, the inward inclination of the outer surface of the tire 4 is substantially 25 degrees from a horizontal plane, so that, the inclination of the tire 4 is sufficient to provide a tread surface for the wheel and yet the inclination of the outer surface of the tire 4 and the inclination of the outer surface of the web 3 are sufficient to deflect the mud, trash, etc., outwardly at one side of the path of travel of the wheel and thereby prevent the accumulation of the mud, trash, etc., upon the wheel and the consequent clogging of the same.

Upon the periphery of the wheel is mounted any desired number of lugs 5. These lugs 5 consist of elongated plates disposed upon the periphery of the wheel in a manner that the longitudinal edges will be disposed transversely with respect to the wheel and with the entire body of the lugs 5 disposed outwardly of the inner edge of the tire 4 of the wheel. To secure the lugs 5 upon the wheel the plates constituting the lugs are provided with the lower apertured ears 6 bent at an angle with respect to the lugs 5 so that the ears 6 will lie flush with the outer surface of the body or web 3 of the wheel in proximity to the tire 4 and are secured upon the web 3 through the medium of the bolts 7 which pass through the apertured ears 6 and apertures formed through the web 3 adjacent thereto. The lugs 5 are also provided with the upper apertured ears 8 bent at an angle with respect to the lugs 5 so that the apertured ears 8 will lie flush upon the outer inclined surface of the tire 4 and secured thereon through the medium of the bolts 9 which pass through the apertured ears 8 and apertures formed through the tire 4 adjacent thereto.

To provide against rupture, breakage, or other damage to the lugs 5 when the wheel is employed in a manner so that the same is required to travel over hard or rocky roads I prefer to reinforce the lugs 5 by the employment of the diagonal brace bars or rods 10 which have one of their ends suitably secured to the forward surfaces of the lugs 5 in proximity to their outer edges and the opposite ends of the brace bars 10 secured to the rear faces of the succeeding lugs 5 at their edges adjacent the tire 4.

I preferably form the hub 2, the web 3 and the tire 4 in an integral structure, but I may, if deemed expedient, form the hub, the web and the tire separately and unite or join the same together in any suitable manner. I may also form the lugs 5 integral with the web and the tire, but I preferably form the lugs in a manner that the same are detachably secured to the web and tire of the wheel.

Figure 2:
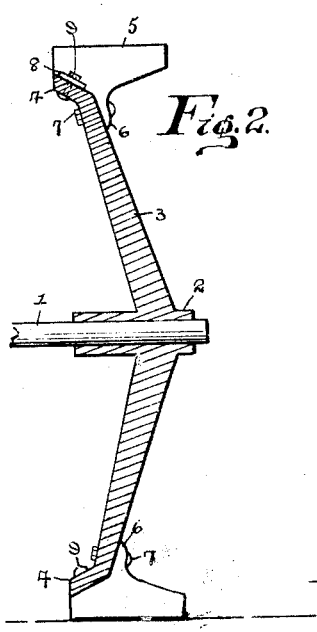
Fig. 2 is a transverse sectional view of the wheel on line 2—2 of Fig. 1 with the supplemental transporting tire removed.
Figure 4:
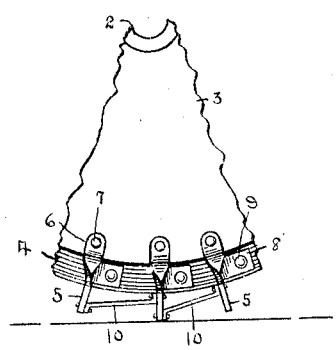
Fig. 4 is a fragmentary view of a portion of the wheel showing the means which I employ for bracing the lugs when necessary.
Figure 3:
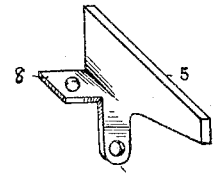
Fig. 3 is a perspective view on an enlarged scale of one of the lugs.

When I employ the wheel provided with the lugs shown in Figs. 1 and 2 and with the brace rods 10 shown in Fig. 4, I preferably provide the supplemental tire 11, which is preferably formed of a band of suitable metal of a width equal to the length of the lugs 5 and provided at certain intervals upon its inner side with the solid lugs 12 and apertured lugs 13 sufficiently spaced from the lugs 12 to permit the lugs 5 to pass therebetween and thread through the apertured lugs 13 the set screws or wing nuts 14 for clamping with lugs 5 of the wheel between the lugs 12 and ends of the set screws or wing nuts 14 of the supplemental tire 11. The supplemental tire is constructed so that the same can be readily attached to or detached from the wheel and is for the purpose of affording protection to the lugs 5 during the transportation of the vehicle, machine, or the like when the same is being transported from place to place over rough surfaces.

From the foregoing it will be seen that I have provided a tractor wheel for use upon vehicles, trucks, tractors, machines, farming implements, and all other vehicles or the like which employ tractor wheels, which wheel constructed in the novel manner as illustrated in the drawings and described in the foregoing specification can not become clogged by mud, trash, or other accumulations upon the surfaces over which the same travels, in view of the fact, that such mud, or trash when coming in contact with the periphery of the wheel will pass between the lugs 5 and be sheared off or deflected by the inclined outer surface of the tire 4 and subsequently by the inclined surface of the body or web 3 of the wheel and finally thrown away from the outer side of the wheel and out of its path of travel so that none of the mud, trash, or accumulation can possibly adhere to any of the surfaces of the wheel and thereby clog the same, for even should the wheel travel through sticky clay the force of the subsequently engaged clay will force that which has been previously engaged along the inclined surfaces of the tire 4 and web 3 and cast the same outwardly from off the wheel.

While I have primarily designed my wheel for use as a tractor wheel, I desire it to be understood that my wheel is not limited to this specific use as the same may be efficiently used as an anti-clog wheel in the manner that the ordinary wheel is used by dispensing with the anti-slip lugs, and that while I have herein shown and described the preferred embodiment of my invention I may resort to variations and alterations in the conformation and construction of the wheel to meet the exigencies of the case without departing from the spirit of the invention or the scope of the claims.

Having described my invention, what I claim as new and desire to secure by Letters Patent, is:—

1. The combination of an elongated hub, an outwardly disposed cone-shaped web thereon, an outwardly inclined tire upon said web disposed in angular relation to the outer surface thereof and extended into vertical alinement with the inner end of the hub, and lugs upon said tire having an outer edge parallel with said hub for substantially the length thereof.

2. The combination of an elongated hub, an outwardly disposed cone-shaped web thereon, an outwardly inclined tire upon said web disposed in angular relation to the outer surface thereof, and lugs provided with elongated contact edges and angularly disposed ears for attachment to said tire and also the upper portion of said web.

In testimony whereof I have signed my name to this specification.

MORGAN C. FRENCH.